United States Patent
Iwanami et al.

(10) Patent No.: US 6,675,596 B2
(45) Date of Patent: Jan. 13, 2004

(54) COMPRESSOR DRIVEN SELECTIVELY BY FIRST AND SECOND DRIVE SOURCES

(75) Inventors: Shigeki Iwanami, Okazaki (JP); Yasuhiko Niimi, Handa (JP); Yukio Ogawa, Kariya (JP); Takashi Inoue, Okazaki (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 10/127,676
(22) Filed: Apr. 23, 2002

(65) Prior Publication Data
US 2002/0157413 A1 Oct. 31, 2002

(30) Foreign Application Priority Data

Apr. 24, 2001 (JP) .......................... 2001-126467
Nov. 28, 2001 (JP) .......................... 2001-362453

(51) Int. Cl.[7] .............................................. F25B 27/00
(52) U.S. Cl. ........................... 62/236; 62/323.4; 417/16
(58) Field of Search .............................. 62/236, 323.3, 62/323.4; 417/374, 16

(56) References Cited

U.S. PATENT DOCUMENTS 4,418,765 A * 12/1983 Mori et al. .................. 173/12

6,443,712 B2 * 9/2002 Saki et al. .................. 417/374
2001/0018025 A1 * 8/2001 Sakai et al. ................. 417/374

FOREIGN PATENT DOCUMENTS

| JP | U-6-87678 | 12/1994 |
| JP | 11-287182 | 10/1999 |
| JP | A-2000-229516 | 8/2000 |

* cited by examiner

*Primary Examiner*—Melvin Jones
(74) *Attorney, Agent, or Firm*—Posz & Bethards, PLC (57) ABSTRACT

A selectively driven compressor for stopping the power generating operation of a motor when an internal combustion engine is operating to make it unnecessary to provide the motor that can withstand high voltage. The system reduces the load on the internal combustion engine. The system includes a pulley driven by a main drive source, an electric motor, which includes an armature and a field system, driven by a power source. The compressor is driven selectively by the pulley or the electric motor. The armature and the field system of the electric motor are independently supported. The pulley is mechanically connected to either of the armature and the field system, and the compressor is mechanically connected to the other.

18 Claims, 11 Drawing Sheets

COMPRESSOR DRIVEN SELECTIVELY BY FIRST AND SECOND DRIVE SOURCES

CROSS REFERENCE TO RELATED APPLICATION

This application relates to and incorporates by reference Japanese patent application no. 2001-126467 filed on Apr. 24, 2001 and Japanese patent application no. 2001-362453 filed on Nov. 28, 2001

BACKGROUND OF THE INVENTION

This invention relates to a compressor with a complex drive system adapted to drive the compressor such that the compressor is rotated selectively by either of a main drive source, such as an internal combustion engine, and an electric motor, which is rotated by a power source such as a battery.

An idle-stop system, which completely stops the internal combustion engine of an automobile when the automobile stops, has been developed in recent years to reduce fuel consumption. However, passengers feel uncomfortable when the automobile stops, because the compressor of the air conditioning system, which is driven by the internal combustion engine, stops operating when the engine stops. This problem can be avoided by using a so called hybrid compressor, which is driven selectively by two power sources, such that the compressor is driven by the electric power stored in a battery when the internal combustion engine is stopped.

Japanese unexamined patent publication Hei. 11-287182 discloses such a hybrid compressor. In this publication, a pulley is fitted to and interlocked with the drive shaft of the compressor by an electromagnetic clutch so that the compressor may be rotated by the internal combustion engine through a belt, and an electric motor, which is driven by a battery, is fitted to the same drive shaft. This is a common arrangement for driving a compressor selectively with two power sources. The electric motor is provided with a power generating function that employs the internal combustion engine as drive source. The compressor is a variable capacity type compressor, and the power generating function is used only when the discharge capacity falls below a predetermined level. More specifically, the electric power generated by the driving force of the internal combustion engine is controlled by a controller to be inversely proportional to the discharge capacity of the compressor. The electric motor has a known configuration and includes a rotor that rotates with its drive shaft (armature) and a stator arranged around the outer periphery of the rotor and rigidly secured to the housing (field system).

With the arrangement described in the above cited publication, the load of the internal combustion engine is prevented from rising dramatically, and the efficiency of energy use of the vehicle is improved, since power is supplied to the compressor in a manner that supports the air conditioning function of the vehicle, because the electric power generation load is eliminated when the compressor load on the internal combustion engine exceeds a certain level.

However, electricity is generated whenever the rotor of the electric motor is driven by the internal combustion engine and the electric motor is forced to produce a high voltage when the electric power generating function is suspended (and the electric path between the electric motor and the battery is blocked) by the control section. Therefore, the insulators and other elements in the electric motor need to be provided with measures that make them withstand a high voltage that may be applied to them, which increases the cost of manufacturing the electric motor. Additionally, when the rotor of the electric motor is driven, a core loss arises as a function of the generated electric current. Thus, the internal combustion engine is forced to consume energy necessary for generating electricity and also for compensating the core loss.

SUMMARY OF THE INVENTION

In view of the above identified problems of the prior art, it is therefore an object of the present invention to provide a complex drive system for a compressor that prevents the power generating function of the electric motor from operating when the internal combustion engine is in operation, which makes it unnecessary to provide the electric motor with a structure for withstanding high voltage and reduces the load on the internal combustion engine.

In a first aspect of the present invention, the above object is achieved by providing a compressor with a complex drive system. The drive system includes a pulley to be driven by a main, or first, source and an electric motor, or second drive source, powered by a power source. The motor has an armature and a field system. The drive system operates the compressor by selectively using the pulley and the electric motor. The armature and the field system of the electric motor are rotatable and independently supported. The pulley is mechanically connected to either of the armature and the field system, and the compressor is mechanically connected to the other of the field system and the armature. The system further includes an interlocking device between the armature and the field system for interlocking the pulley and the compressor to make the compressor follow the rotary motion of the pulley.

When the main, or first, drive source, which is typically an internal combustion engine, is operating, the driving force of the first drive source is transmitted to either of the armature and the field system from the pulley. Then, the drive force is further transmitted to the other of the armature and the field system by the interlocking device. Since the armature and the field system are driven synchronously, the electric motor is prevented from generating electric power while the first drive source is in operation so that no high voltage will be produced in the electric motor. Therefore, insulators and other elements in the electric motor do not need to be provided with measures that make them withstand high voltage, which reduces the cost of manufacturing the electric motor. Additionally, unnecessary power generation and the accompanying core loss are avoided, which reduces the load on the first drive source.

Preferably, the pulley is formed at least the outer peripheral surface of a unitary rotary sleeve, and the field system is arranged directly on the inner surface of the rotary sleeve. The armature is arranged at the center of the rotary sleeve to face the field system, and at least a part of the rotary sleeve is used as electric motor housing.

Accordingly, since no electromagnetic clutch is provided and a single electric motor housing is formed on the inner surface of the pulley with the electric motor arranged in the inside of the housing, the size of the pulley including the electric motor in the inside thereof can be reduced and its weight is also remarkably reduced. Thus, the electric motor can be manufactured at low cost.

Alternatively the field system may be arranged directly on the inner surface of a unitary rotary sleeve, while the armature and the field system are contained in a dedicated motor housing of the electric motor. The electric motor may be bonded to the compressor to be integral with the compressor. Then, a conventional pulley may be used.

Preferably, the field system of the electric motor is formed by using a permanent magnet, and the inner surface of the permanent magnet constitutes a field surface facing the outer peripheral surface of the armature. Then, the electric motor has the form of a simple magneto-type electric motor.

Alternatively, the field system of the electric motor may be formed by using an iron core provided with coils, and the inner surface of the iron core may form a wound field system facing the outer peripheral surface of the armature.

Preferably, the interlocking device is a one-way clutch such that the torque of the first drive source is transmitted from the pulley to the compressor by the one-way clutch when the compressor is driven by the main drive source, and the pulley is allowed to rotate in an advancing direction by the slipping motion of the one-way clutch when the compressor is driven by the electric motor.

Accordingly, when the compressor is driven by the electric motor, the one-way clutch slips so that the pulley and the main drive source are substantially halted.

Preferably, when the compressor is driven by the main drive source and the electric motor is operated, the clutch causes the compressor to rotate with the revolutions per unit time of the pulley plus the revolutions per unit time of the electric motor. Thus, the compressor may be driven to have a high fluid discharging rate, while the compressor itself is relatively small.

Since the complex drive system of the first embodiment is not provided with an electromagnetic clutch, the compressor is constantly driven by the pulley when the main drive source is in operation. Therefore, preferably, the compressor is a variable capacity type compressor in order to make it possible to change the discharging capacity of the compressor independently of the rotational speed of the main drive source.

Alternatively, the compressor may be a fixed capacity type compressor with a clutch located between the pulley and either the armature or the field system to prevent the torque of the pulley from driving the compressor.

Accordingly, it is possible to drive the compressor and stop the compressor at any time it while the main drive source is in operation. Thus the compressor can be operated at the required discharge rate. Thus, the load and the energy consumption of the first drive source are reduced.

Additionally, while a variable capacity type compressor is normally has low efficiency at a reduced discharge rates, a fixed capacity type compressor does not have this problem. Thus, an air conditioning system with a fixed capacity compressor can always be operated efficiently.

Preferably, the electric motor is provided with electric power delivery apparatus to be used for at least either the armature or the field system and the power delivery apparatus is formed by brushes and at least either slip rings or commutators.

The armature of the electric motor can rotate. According to the invention, the field system is supported in such a way that it can also rotate. Therefore, if the electric motor is a commutator type electric motor, not only are commutators and brushes, which make sliding contact with the commutators, located between the field system and the armature, but brushes and the slip rings are located between either the field system or the armature and a stationary part of the compressor.

Thus, two sets of brushes may be needed. Therefore, preferably, when the armature and the rotary sleeve are provided respectively with the commutators and the brush, and when the stationary housing of the compressor is provided with the slip rings, a brush may be located to make sliding contact with both the commutators and the slip rings simultaneously. Accordingly, a single brush operates as two brushes.

The electric motor is not operated when the compressor is driven by the main drive source. However, the sliding contact area of the brush and the slip rings or the commutators in the inside of the electric motor may be unnecessarily worn and power is wasted even when the electric motor is not driven. This problem may be solved by using an arrangement such that, when the compressor is driven by the main drive source by the pulley, the brushes are automatically moved away from the slip rings or the commutators or away from both the slip rings and the commutators.

Preferably, a shaft sealing device for restricting leakage of fluid and lubricating oil from the inside of the compressor is arranged between the pulley and the electric motor.

Accordingly, the inside of the electric motor and that of the compressor can communicate with each other so that, if fluid flowing to the compressor is permitted to flow toward the electric motor, the fluid cools the motor and improves the service life of the electric motor. Alternatively, the size of the electric motor may be reduced at the cost of the extra service life.

Preferably, the first drive source is an internal combustion engine mounted in a vehicle, which is provided with an idle stop control function. Preferably, the compressor is used as the refrigerant compressor of the air conditioning system of the vehicle. Preferably, the power source of the electric motor is a battery mounted in the vehicle.

The parenthesized reference symbols shown above correspond to the specific components of the embodiments described herein.

DETAILED DESCRIPTION OF THE PREFERRED EMBODIMENTS

The present invention will be described with reference to the accompanying drawings, which illustrate preferred embodiments of the invention.

First Embodiment

Figure 1:
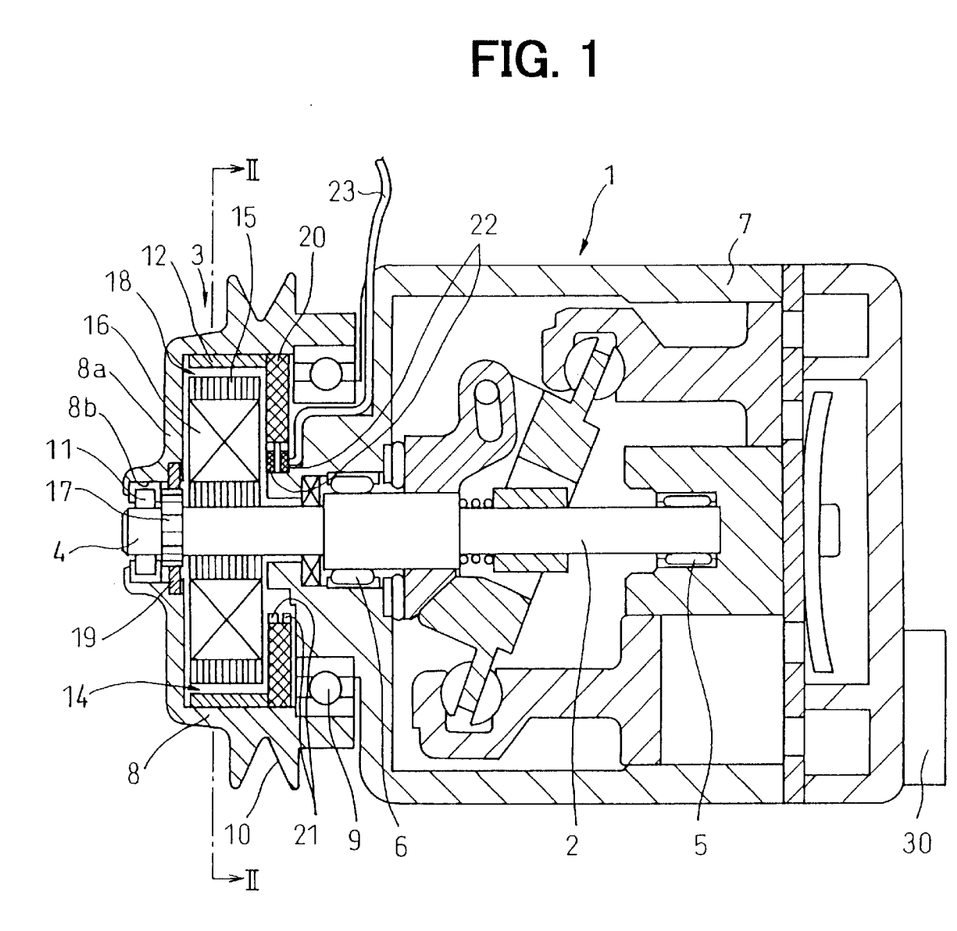
FIG. 1 is a longitudinal cross-sectional view of a principal part of a first embodiment of the invention.
Figure 2:
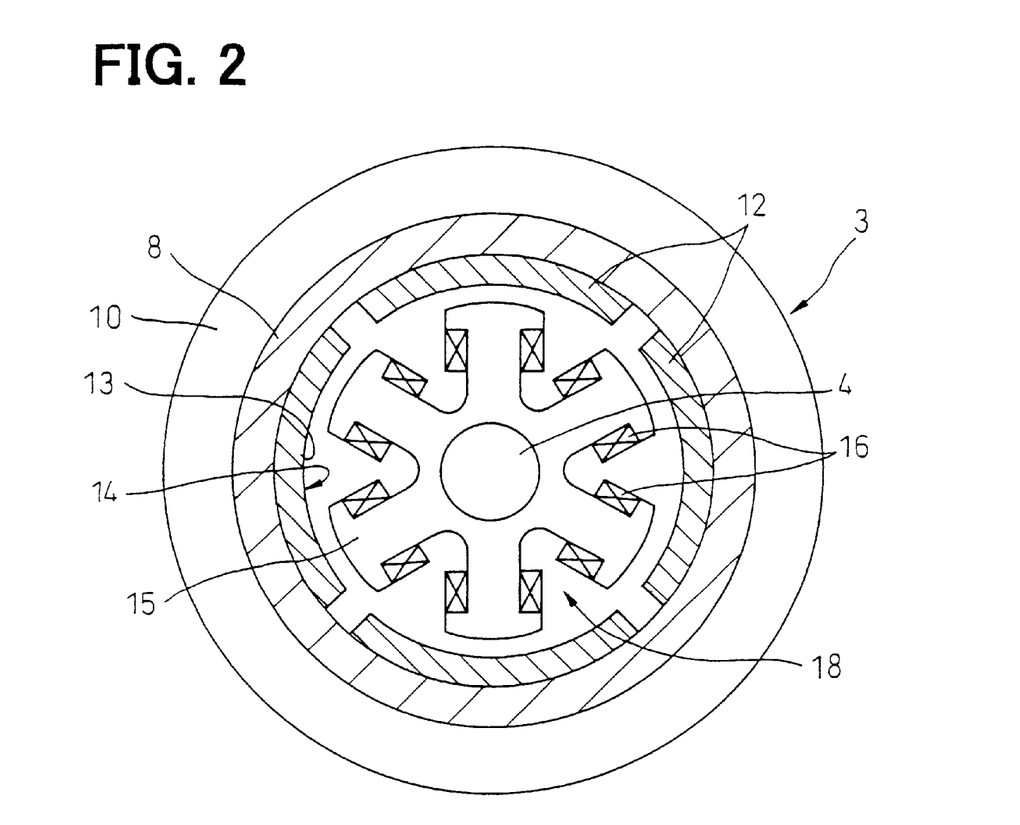
FIG. 2 is a cross-sectional view taken along line II—II in FIG. 1.
Figure 3:
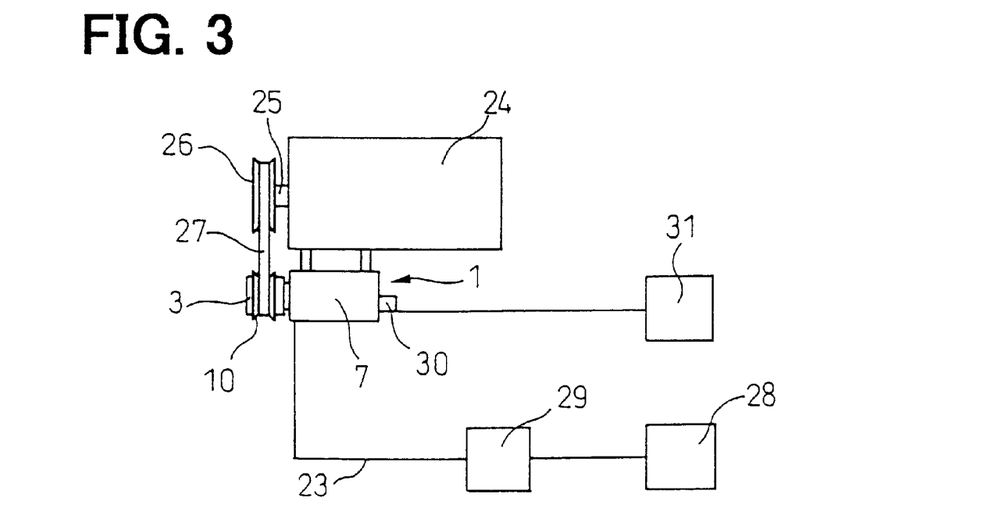
FIG. 3 is a block diagram of a complex drive system of a compressor according to the invention, illustrating its configuration.

FIGS. 1 through 3 show a first embodiment of a complex drive system for a compressor 1. As shown in FIG. 1, the compressor 1 is a known swash plate type compressor 1, which has a variable displacement. The compressor 1 has a drive shaft 2 at its midsection. Since the configuration of the swash type compressor 1 is known, it will not be described here in greater detail. In short, as the drive shaft 2 is driven, fluid, which is normally a refrigerant for an air conditioning system, is drawn in, compressed and subsequently discharged. The discharge capacity of the compressor 1 per revolution can be regulated continuously as a function of the cooling load by changing the angle of inclination of the swash plate.

The drive shaft 2 is driven directly by a pulley motor 3 or indirectly by a main drive source, which in this embodiment is an internal combustion engine, through a rotary shaft 4 of the pulley motor 3. The drive shaft 2 of the compressor 1 and the rotary shaft 4 of the pulley motor 3 are coaxially and integrally combined. The combined shaft is supported by bearings 5 and 6 in the compressor 1. A housing 7 of the compressor 1 is rigidly fixed by appropriate hardware (not shown). A rotary sleeve 8, which serves as the housing of the pulley motor 3, is supported by bearings 9 that are fitted to an end of the housing 7. A belt pulley 10 is formed on the outer periphery of the rotary sleeve 8.

An end wall 8a, which closes the front end of the rotary sleeve 8, is provided with a central opening 8b, and a one-way clutch 11 is fitted in the opening 8b. When the drive shaft 2 of the compressor 1 is driven by the main drive source (the engine, in this embodiment) the one-way clutch 11 engages and transmits torque from the pulley 10 and the rotary sleeve 8 to the rotary shaft 4. On the other hand, when the main drive source is stopped and the drive shaft 2 of the compressor 1 is driven by the pulley motor 3, the one-way clutch 11 is disengaged, or slips, and the rotary shaft 4 rotates in an advancing direction, which allows the pulley 10 and the rotary sleeve 8 to remain stationary.

Additionally, when the compressor 1 is driven by the main drive source and the pulley motor 3 is operated (to drive the drive shaft 2), the drive shaft 2 of the compressor 1 is driven with the revolutions per unit time of the pulley 10 and the rotary sleeve 8 plus the revolutions per unit time of the pulley motor 3.

The clutch 11 need only transmit rotation of the pulley 10 to the compressor 1 when the pulley 10 drives the compressor and break the transmission when it is not necessary to transmit rotation from the pulley 10 to the compressor. Therefore, the clutch 11 may be an ordinary electromagnetic clutch instead of a one-way clutch 11.

Now, the internal structure of the pulley motor 3 will be described also by referring to FIG. 2. A plurality of (four in FIG. 2) permanent magnets 12 are directly bonded to the inner surface of the rotary sleeve 8 of the pulley motor 3 to form a field system 14. The permanent magnets 12 are magnetized in a radial direction. Note that, since any two adjacent permanent magnets 12 are magnetized in opposite directions, in the circumferential direction of FIG. 2, the permanent magnets 12 have alternating polarities (N, S, N, S) along the substantially cylindrical field surface 13 of the field system 14 formed by the inner surfaces of the permanent magnets 12. Since the field system 14 is integral with the rotary sleeve 8, the field system 14 rotates with the pulley 10 and other related components when the drive shaft 2 is driven by the main drive source, unlike ordinary motors.

The pulley motor 3 includes an armature 18, which includes a star-shaped armature iron core 15. The core 15 has a plurality of radial projections fitted to the rotary shaft 4. A narrow radial gap exists between the core 15 and the field surface 13. A coil 16 is wound around each of the projections of the iron core 15, and the opposite ends of the coils 16 are connected to a plurality of commutators 17, which are fitted to the rotary shaft 4 by an insulating member in a known manner. In the instance of FIG. 1, since the armature iron core 15 has six projections and six coils 16, six commutators 17 are arranged to equally divide the outer periphery of the rotary shaft 4 by six. The commutators 17 are separated by narrow gaps and are thus electrically isolated from each other.

An electric power supply apparatus for supplying electric power to each of the coils 16 of the armature 18 is formed by a first pair of brushes 19, two slip rings 21 and a second pair of brushes 22. The brushes 19 of the first pair are radially fitted in the opening 8b, which is formed at the center of the bottom wall 8a of the rotary sleeve 8, by an insulator. The brushes 19 of the first pair sequentially contact the commutators 17. Each of the brushes 19 of the first pair are inwardly biased (radially) by respective springs (not shown). The slip rings 21 are arranged along the inner peripheral edge of an annular disk 20, which is made of an insulating material and is rigidly secured to the inside of the rotary sleeve 8. The slip rings are connected to the respective brushes 19 by conductors (not shown). The second pair of brushes 22 is fitted to part of the fixed housing 7 of the compressor 1 to make sliding contact with the respective slip rings 21. The brushes 22 of the second pair are biased radially outward by respective springs (not shown). Two conductors 23 are respectively connected to the brushes 22 of the second pair.

Thus, the compressor 1 and the pulley motor 3 that is linked to it are as described above, and the complex drive system of the compressor is generally illustrated in FIG. 3. A belt 27 is wound around the compressor pulley 10 and an engine pulley 26, which is driven by an output shaft 25 of an internal combustion engine 24, which serves as the main drive source. The housing 7 of the compressor 1 and the internal combustion engine 24 are fixed to the frame of the vehicle and are rigid relative to one another. The conductors 23 are connected to a power supply, such as a battery 28 mounted in the same vehicle, and a motor control device 29, which typically includes a relay circuit, is arranged in the circuit path of the conductors 23.

The compressor 1 is provided with a control valve 30 for controlling the discharge capacity of the compressor 1, and the position of the control valve 30 is controlled by a capacity control device 31, which regulates the cooling capacity of the compressor 1. Such a valve and controller are typical in conventional variable capacity type swash plate type compressors.

Figure 9A:
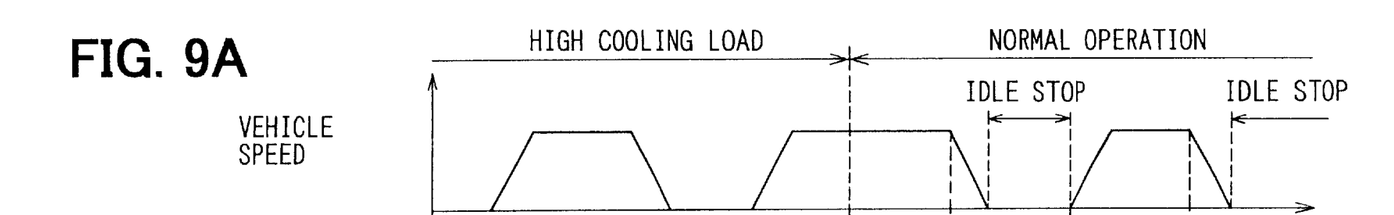
FIG. 9A is a graph illustrating the running speed of the vehicle versus time.
Figure 9B:
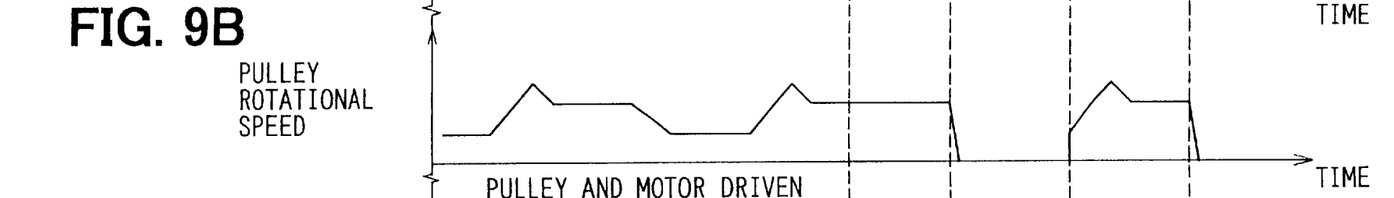
FIG. 9B is a graph illustrating the revolutions per unit time of the internal combustion engine (or the pulley) versus time.

The torque of the output shaft 25 is transmitted to the rotary sleeve 8, which also serves as the housing of the pulley motor 3, through the pulley 26, the belt 27 and the pulley 10, while the internal combustion engine 24 is operating in a normal running mode as shown in FIG. 9A. Since the one-way clutch 11 is engaged in this mode of operation, the torque of the rotary sleeve 8 is transmitted to the rotary shaft 4 by the one-way clutch 11 and also to the drive shaft 2, which is integral with the rotary shaft 4. As a result, the compressor 1, which is the refrigerant compressor of the air conditioning system of the vehicle, is driven by the internal combustion engine 24. Since it is not necessary to drive the compressor 1 with the pulley motor 3 in this mode of operation, the motor control device 29 breaks the circuit for supplying electric power to the pulley motor 3. Therefore, the armature 18 of the pulley motor 3 fitted to the rotary shaft 4 simply turns idly in synchronism with the field system 14 of the rotary sleeve 8.

While the internal combustion engine 24 is operating in a normal running mode, the field system 14 and the armature 18 of the pulley motor 3 rotate in synchronism with each other. Thus, the pulley motor 3 is prevented from generating electricity while the internal combustion engine 24 is in operation, and no high voltage is produced within the pulley motor 3. Therefore, it is not necessary to make the insulating sections and other elements of the pulley motor 3 withstand high voltage, and thus the pulley motor 3 can be manufactured at low cost. Additionally, the core loss due to power generation can be eliminated during the idle period and the load of the internal combustion engine 24 is reduced.

Additionally, since no electromagnetic clutch is employed and a unitary motor housing is formed on the inner surface of the pulley 10 such that the pulley motor 3 is arranged within the housing, the pulley 10 including the size of the pulley motor 3 can be significantly reduced and its weight is relatively low. Also, the cost of manufacturing the pulley motor 3 is reduced.

Figure 9C:
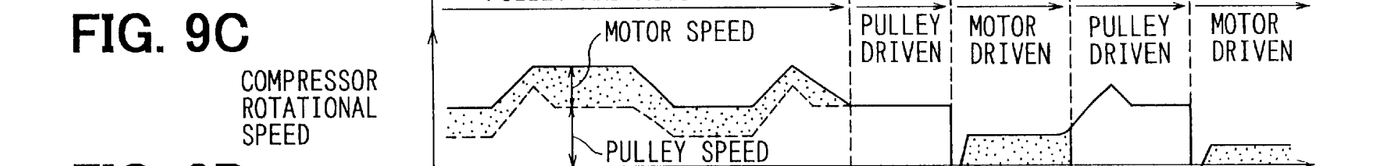
FIG. 9C is a graph illustrating revolutions per unit time of the compressor versus time.
Figure 9D:
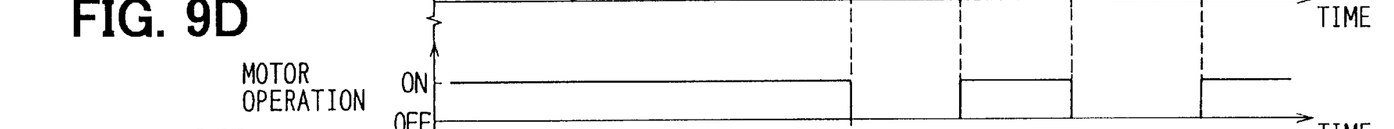
FIG. 9D is a graph illustrating the operation state of the motor versus time.
Figure 9E:
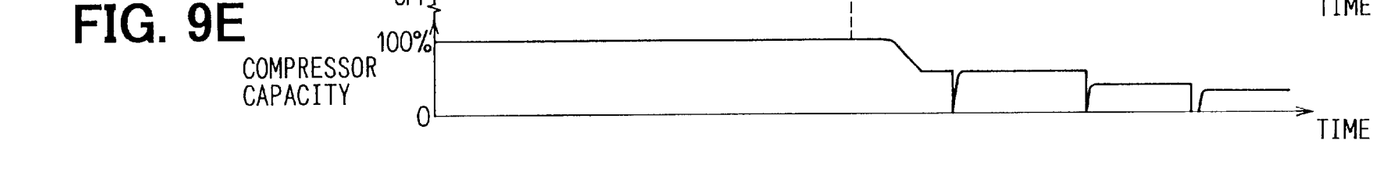
FIG. 9E is a graph showing the capacity (displacement) of the compressor versus time.

As shown in FIG. 9E, the discharge capacity, or displacement, of the compressor 1 can be regulated continuously by changing the angle of inclination of the swash plate with the capacity control device 31. The discharge capacity can be regulated in the same way when the compressor 1 is driven by the pulley motor 3. Since no electromagnetic clutch is provided, in the first embodiment, the drive shaft 2 of the compressor 1 is always driven when the internal combustion engine 24 operates. Therefore, if the compressor 1 is the refrigerant compressor of an air conditioning system, the compressor 1 is preferably the variable capacity type as shown in FIG. 1 to control the cooling capacity of the air conditioning system.

Additionally, as shown in FIG. 9, the pulley motor 3 is supplied with DC power from the battery 28 to continue the operation of the air conditioning system of the vehicle when the internal combustion engine 24 stops under the control of the idle stop control system. In the case of the first embodiment, electric power from the battery 28 is supplied to one of the second pair of brushes 22 by one of the conductors 23 and then further to one of the slip rings 21, which the brushes 22 contact. Then, the electric power is delivered to one of the first pair of brushes 19, which are connected to the slip rings 21. Power is further conducted by the commutators 17, which connect the first brushes 19 to a specific one of the coils 16. As a result, the magnetized part of the iron core 15 is attracted to or repelled from the corresponding one of the plurality of permanent magnets 12 of the field system 14 to generate torque in the armature 18 so that the armature 18 and the rotary shaft 4 rotate relative to the field system 14 and the rotary sleeve 8, which are stationary with respect to the output shaft 25 of the internal combustion engine 24. Since the one-way clutch 11 turns idly, or slips, at this time, the pulley 10 and the rotary sleeve 8 can be held stationary with respect to the output shaft 25 of the internal combustion engine 24. Thus, the drive shaft 2 of the compressor 1 is driven by the armature 18 of the pulley motor 3 to maintain the operation of the air conditioning system when the internal combustion engine 24 is stopped.

Additionally, when the air conditioning system is operating with a high cooling load, which is a typical condition in summer, as shown in FIG. 9C, the revolutions per unit time of the pulley motor 3 can be added to the revolutions per unit time of the driven pulley 10 by supplying electric power to the pulley motor 3 with the motor control device 29. This will increase the total revolutions per unit time of the compressor 1 and the refrigerant discharging capacity of the compressor 1. Thus, a small value can be selected for the discharging capacity per revolution of the compressor 1, which allows the use of a very compact compressor.

Second Embodiment

Figure 4:
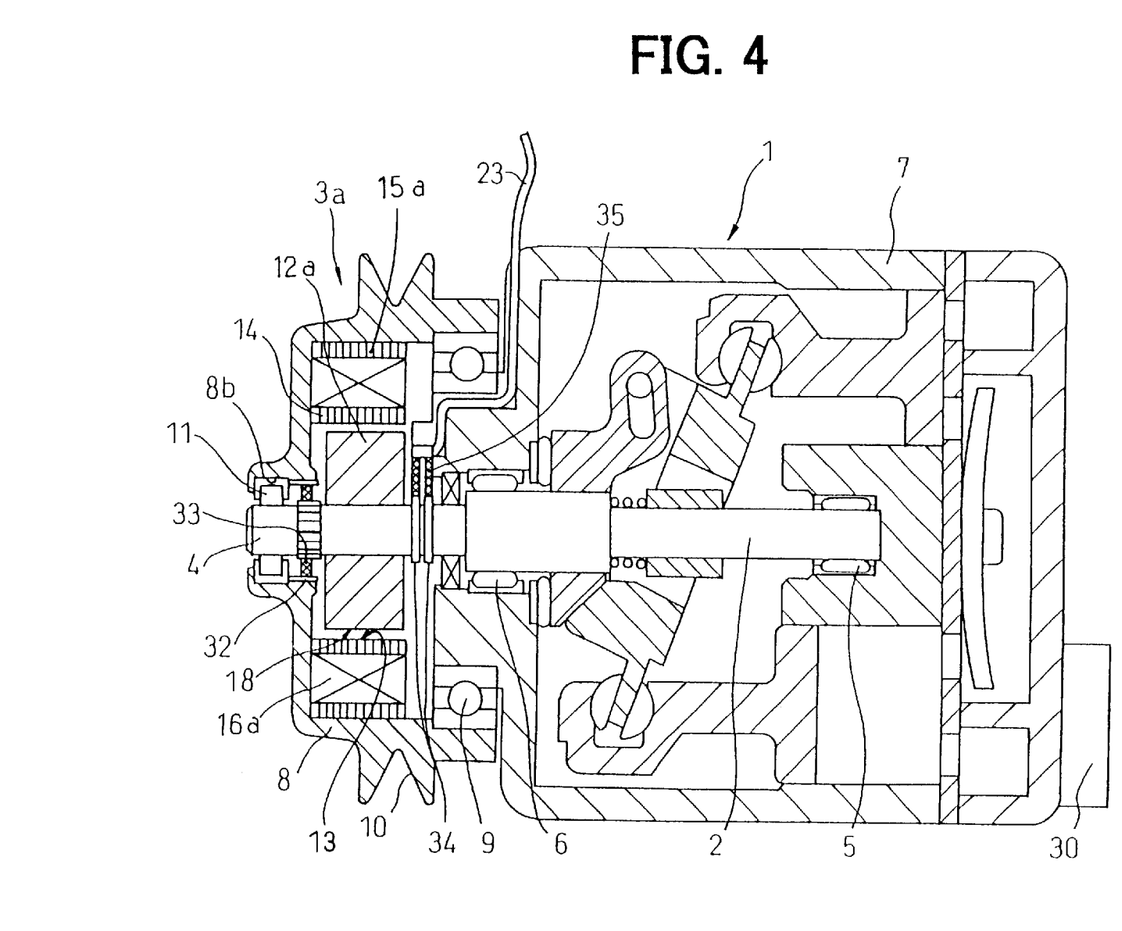
FIG. 4 is a longitudinal cross-sectional view of a principal part of a second embodiment of the invention.

FIG. 4 shows a principal part of a second embodiment of the invention. The complex drive of the second embodiment includes a pulley motor 3a and a compressor 1, which is similar to the compressor 1 of the first embodiment. The parts of the pulley motor 3a that are substantially same as their counterparts in the pulley motor 3 of the first embodiment are given the same reference symbols and will not be described in detail. While the pulley motor 3a of the second embodiment has parts that are structurally different from those of the first embodiment, the overall configuration of the complex drive is same as that shown in FIG. 3. Therefore, its operation and effects are basically same as those of the first embodiment.

In the first embodiment of FIG. 1 and FIG. 2, the field system 14 is provided with permanent magnets 12, and the iron core 15 of the armature 18 is provided with coils 16, which are equipped with power delivery apparatus. On the other hand, in the pulley motor 3a of the second embodiment, coils 16a are wound in a plurality of areas of the iron core 15a of the field system 14, and a plurality of permanent magnets 12a, which are magnetized in the radial direction, are fitted to the rotary shaft 4 to serve as the armature 18. The electric power delivery apparatus for introducing power to the coils 16a is slightly different from its counterpart of the first embodiment.

The opposite ends of each of the plurality of coils 16a, which are fitted to the inner surface of the rotary sleeve 8, are connected to an associated two of a plurality of commutators 32, which are fitted to the inner surface of the opening 8b of the rotary sleeve 8, and an insulating member is located between the commutators 32. Two brushes 33, which are biased radially outward, are fitted to the drive shaft 2 to make sliding contact with two of the plurality of commutators 32. The two brushes 33 are insulated from one another. With this arrangement, electric power is supplied to a specific one of the coils 16a depending on the rotary position of the armature 18 and a corresponding iron core 15a is magnetized and attracted to or repelled from the corresponding one of the permanent magnets 12 of the armature 18, so that the armature 18 is driven relative to the field system 14, that is, when the internal combustion engine 2 is stopped.

Like the two brushes 33 fitted onto the rotary shaft 4 with an insulating member between them, two slip rings 34, which are connected to the respective brushes 33 by respective pairs of conductors (not shown) located inside of the rotary shaft 4, are fitted to the rotary shaft 4, and with an insulating member is located between them. Two brushes 35, which make sliding contact with the respective slip rings 34, are fitted to the housing 7 of the compressor 1 and are biased radially outward by respective springs (not shown). The brushes 35 are connected to the motor control device 29 and the battery 28 by conductors 23 as shown in FIG. 3. With this arrangement, the pulley motor 3a has substantially the same advantages as the pulley motor 3 of the first embodiment.

Third Embodiment

Two pairs of brushes including a second pair of brushes 22 or 35 in association with the slip rings 21 or 34, and first pair of brushes 19 or 33, in association with the commutators 17 or 32, have to be provided at two positions in the pulley motors 3 and 3a of the first and second embodiments. This arrangement may make the overall configuration of each of the above embodiments complicated. In view of this problem, brushes may be collectively arranged at a single position in a pulley motor 3b of a third embodiment shown in FIG. 5. Otherwise, the pulley motor of this embodiment is similar to that of the pulley motor 3 of the first embodiment and has similar advantages.

Figure 5:
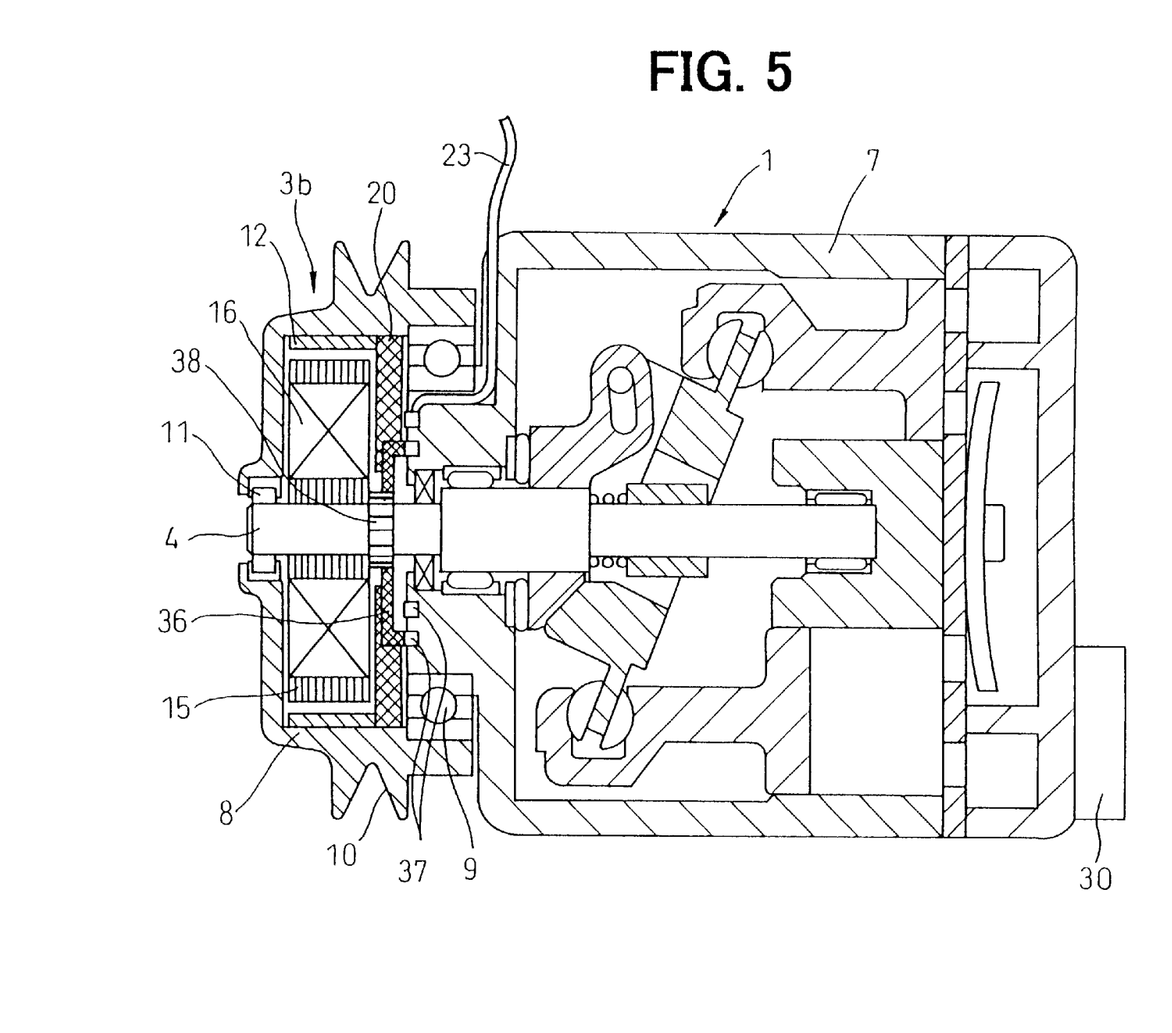
FIG. 5 is a longitudinal cross-sectional view of a principal part of a third embodiment of the invention.

It may be understood by comparing FIG. 5 and FIG. 1 that in the third embodiment, two L-shaped brushes 36 are supported in a radial disk 20, which is made of an insulating material and fitted to the rotary sleeve 8. The brushes 36 are biased radially inward and axially toward the compressor by two respective leaf springs located in grooves. Axial legs of the brushes 36 make sliding contact with respective annular slip rings 37, which are arranged coaxially on the axial end of the housing 7 and are insulated, and radial legs of the brushes 36 make sliding contact with a plurality of commutators 38 fitted to the rotary shaft 4 by an insulating member. The slip rings 37 are connected to the motor control device 29 and the battery 28 by conductors 23 as in the first embodiment.

Fourth Embodiment

Figure 6:
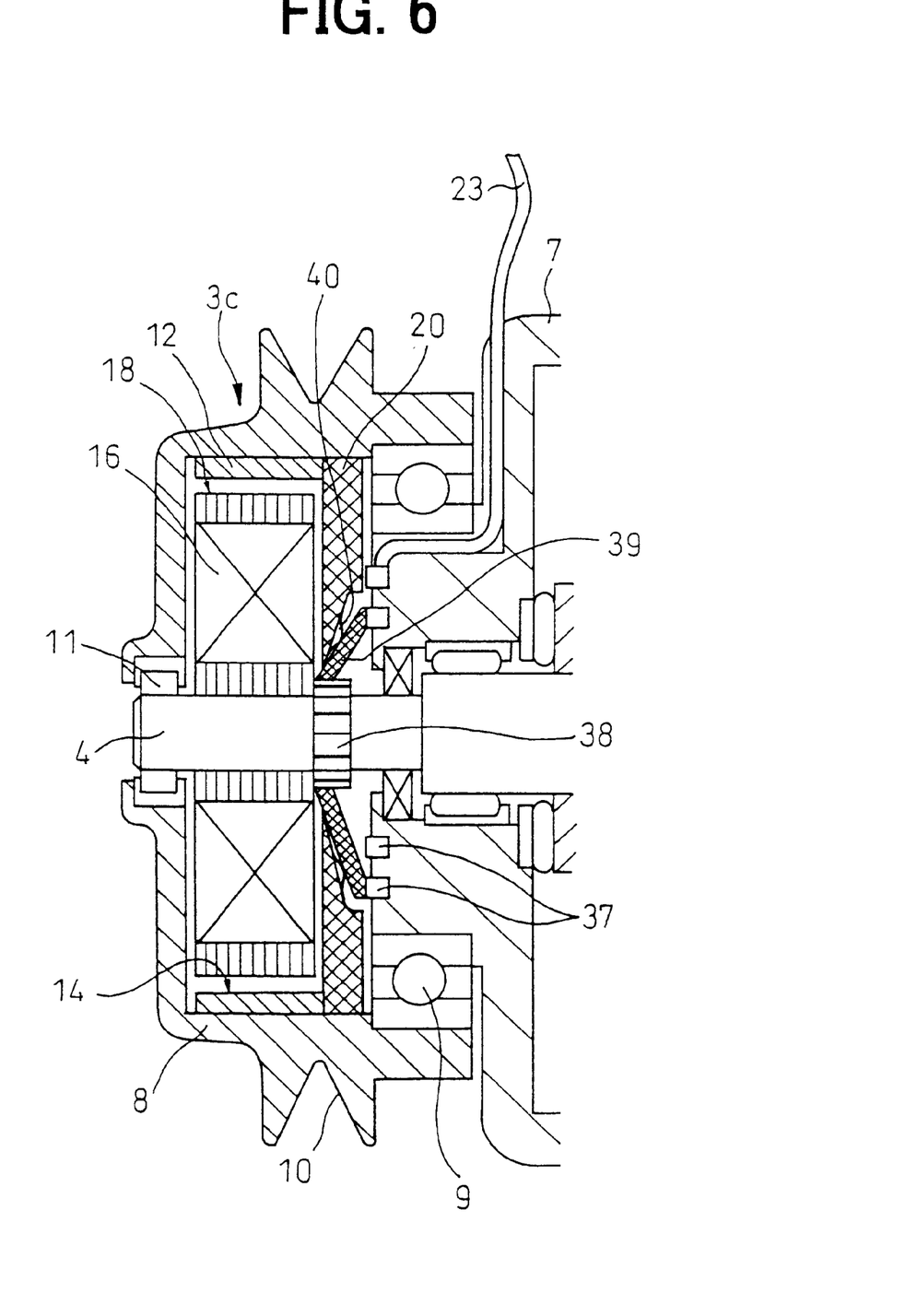
FIG. 6 is a longitudinal cross-sectional view of a principal part of a fourth embodiment of the invention in an operating state.
Figure 7:
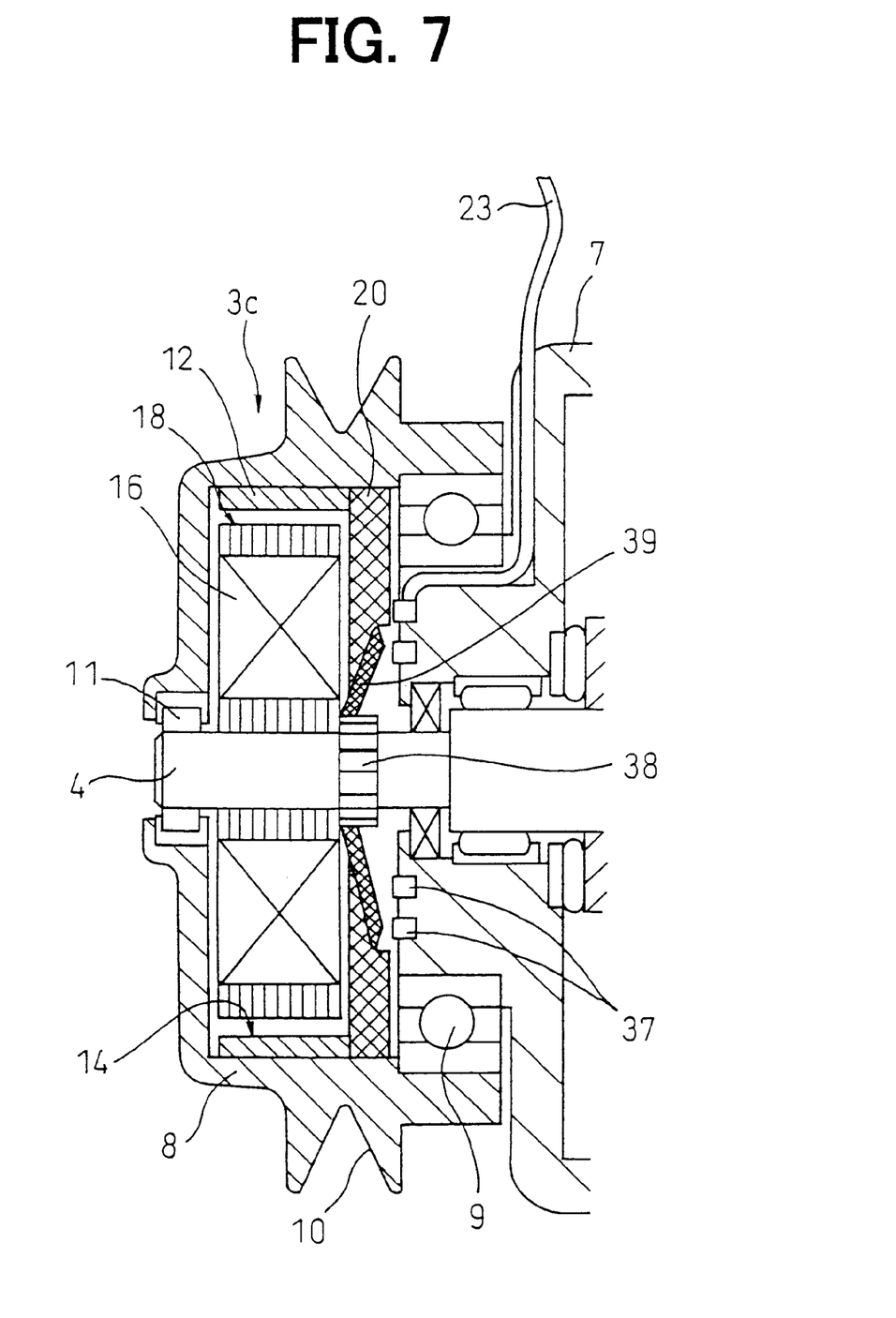
FIG. 7 is a longitudinal cross-sectional view of a principal part of the fourth embodiment of the invention in another operating state different from that of FIG. 6.

FIGS. 6 and 7 show a pulley motor 3c, which is a principal part of a fourth embodiment of the invention, in two different states. In the pulley motors of the preceding embodiments, the brushes are constantly held in sliding contact with the slip rings and/or the commutators. In other words, the brushes are held in sliding contact with the slip rings and/or the commutators even when the pulley motor is not operating. Therefore, the parts that are held in sliding contact are unnecessarily worn. However, in the fourth embodiment, the brushes are automatically retracted from the surface they contact when there is no need for the brushes to function, to prevent the areas of the related components from being unnecessarily worn.

Otherwise, the pulley motor 3c of the fourth embodiment is similar to that of the pulley motor 3b of the third embodiment (see FIG. 5). In the fourth embodiment, a disk 20, which made of insulating material, has an inclined portion, as shown, and the brushes 39, which are located in a groove of the disk 20, are rod-shaped. The brushes 39 can be held in sliding contact with the slip rings 37 and the commutators 38 simultaneously as in the case of the third embodiment. FIG. 6 shows the pulley motor 3c while in operation. Under the illustrated conditions, the internal combustion engine 24 is stopped, and the rotary sleeve 8 is also stopped, and the brushes 39 are urged radially and axially by urging members, such as leaf springs 40, arranged in the grooves. Therefore, the brushes 39 are held in sliding contact with the slip rings 37 and the commutators 38 at the same time.

On the other hand, FIG. 7 shows the pulley motor 3c while not in operation. In other words, the compressor 1 is driven by the internal combustion engine 24. Under these conditions, the rotary sleeve 8 rotates with the pulley 10, and the brushes 39 rotate around the rotary shaft 4 so that the brushes 39 are automatically moved away from the slip rings 37 due to centrifugal force. Since the brushes 39 are also moved radially to a small extent at the same time, they are separated from the commutators 38 on the rotary shaft 4 also. Thus, when the compressor 1 is driven by the internal combustion engine 24, the ends of the brushes 39 are prevented from being worn along with the slip rings 37 and the commutators 38. In addition to preventing wear, this also reduces the load on the engine.

Fifth Embodiment

The pulley motor used for the complex compressor drive system in each of the preceding embodiments is a commutator type motor that uses permanent magnets. While a commutator type motor that employs permanent magnets has a simple configuration and hence is available at low cost, the present invention is by no means so limited and is applicable to pulley motors of other known types including a series wound type, a shunt wound type or an induction type, to support the field system of the motor in a rotatable manner.

Figure 8:
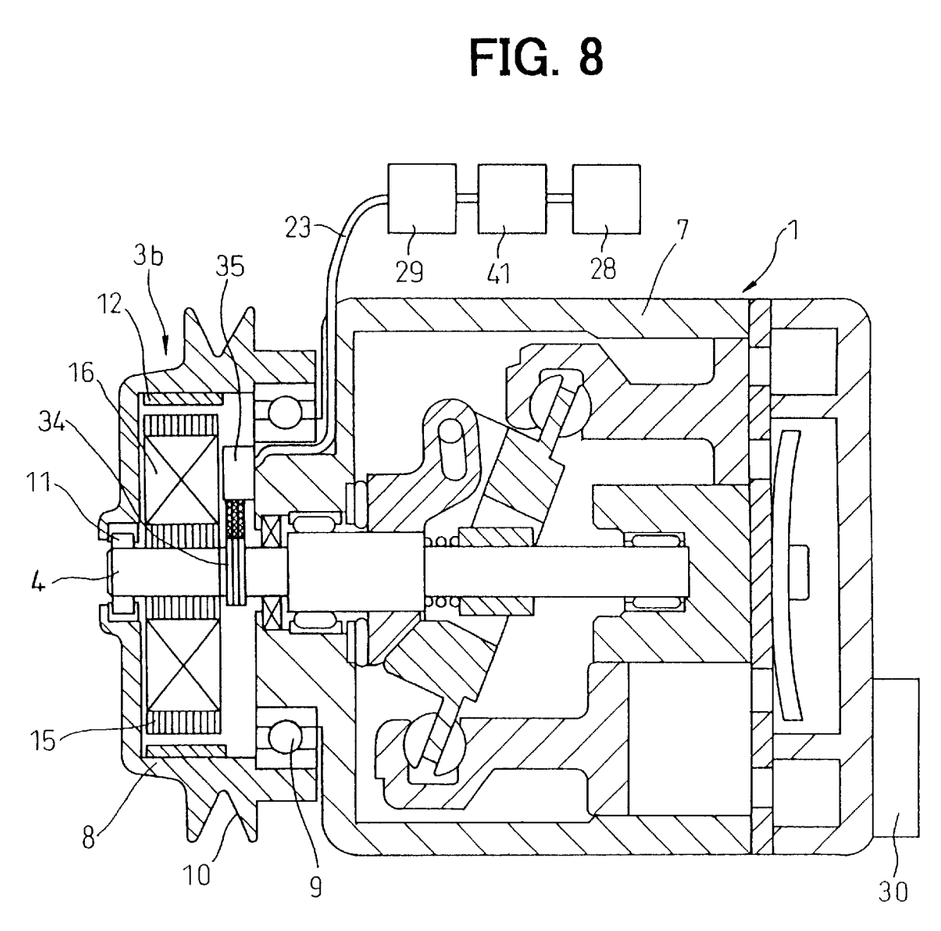
FIG. 8 is a longitudinal cross-sectional view of a principal part of a fifth embodiment of the invention.

As for the power supply for the pulley motors 3, 3a, 3b, 3c the present invention is by no means limited to DC power from a DC power source such as battery 28. AC power obtained by converting DC power supplied from a DC power source with an inverter may also be used for powering the motor. FIG. 8 illustrates a fifth embodiment of the invention, which includes an inverter 41 for converting DC power from battery 28 into 3-phase AC power. The motor control device 29 controls the 3-phase AC power and supplies AC power to the coils 16 by three brushes 35 and three slip rings 34, which make sliding contact with the brushes 35. As a result, the coils 16 generate a rotating magnetic field in the iron core 15. When using AC power, compared to DC power, the commutators may be changed to slip rings, and the number of brushes and that of slip rings can be reduced, as shown in FIG. 8.

Sixth Embodiment

Figure 10:
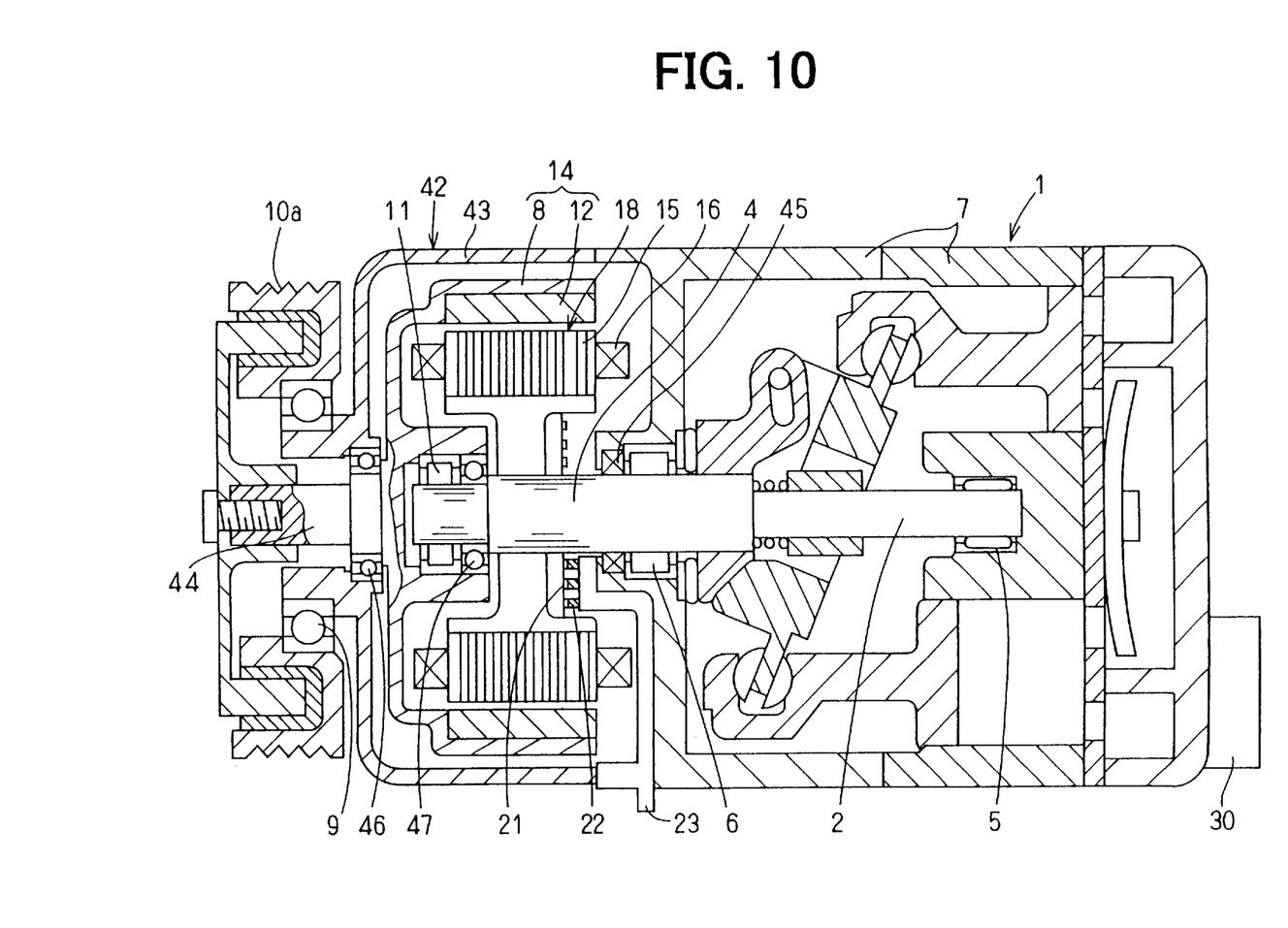
FIG. 10 is a longitudinal cross-sectional view of a principal part of the sixth embodiment of the invention.

FIG. 10 illustrates a principal part, or a motor 42, of a sixth embodiment of the invention and a compressor 1 having a configuration similar to that of the first embodiment. The sixth embodiment differs from the first through fifth embodiments in that the motor 42 is separated from the pulley 10a.

The field system 14 is formed by arranging permanent magnets 12 directly on the inner surface of a rotary sleeve 8. The armature 18 is arranged at the center of the field system 14 and both the armature 18 and the field system 14 are housed in a motor housing 43 to produce the complete motor 42. The motor housing 43 of the motor 42 is fixed to the housing 7 of the compressor 1 to make an integral unit. A shaft sealing device 45 is arranged between the compressor 1 and the motor 2 to prevent fluid or lubricating oil from leaking from the inside of the compressor 1 about the shaft 4.

The pulley rotary shaft 44 of the pulley 10a is connected to the field system 14 and supported by bearings 46. The rotary shaft 4 of the armature 18 is connected to the drive shaft 2 of the compressor 1 and supported by bearings 6, 47. A one-way clutch 11 is located between the field system 14 and the armature 18.

This embodiment employs a conventional pulley 10a. While this embodiment is comparable to known complex drive systems in terms of reducing the size of the pulley 10a, it otherwise provides advantages similar to those of the first embodiment.

Seventh Embodiment

Figure 11:
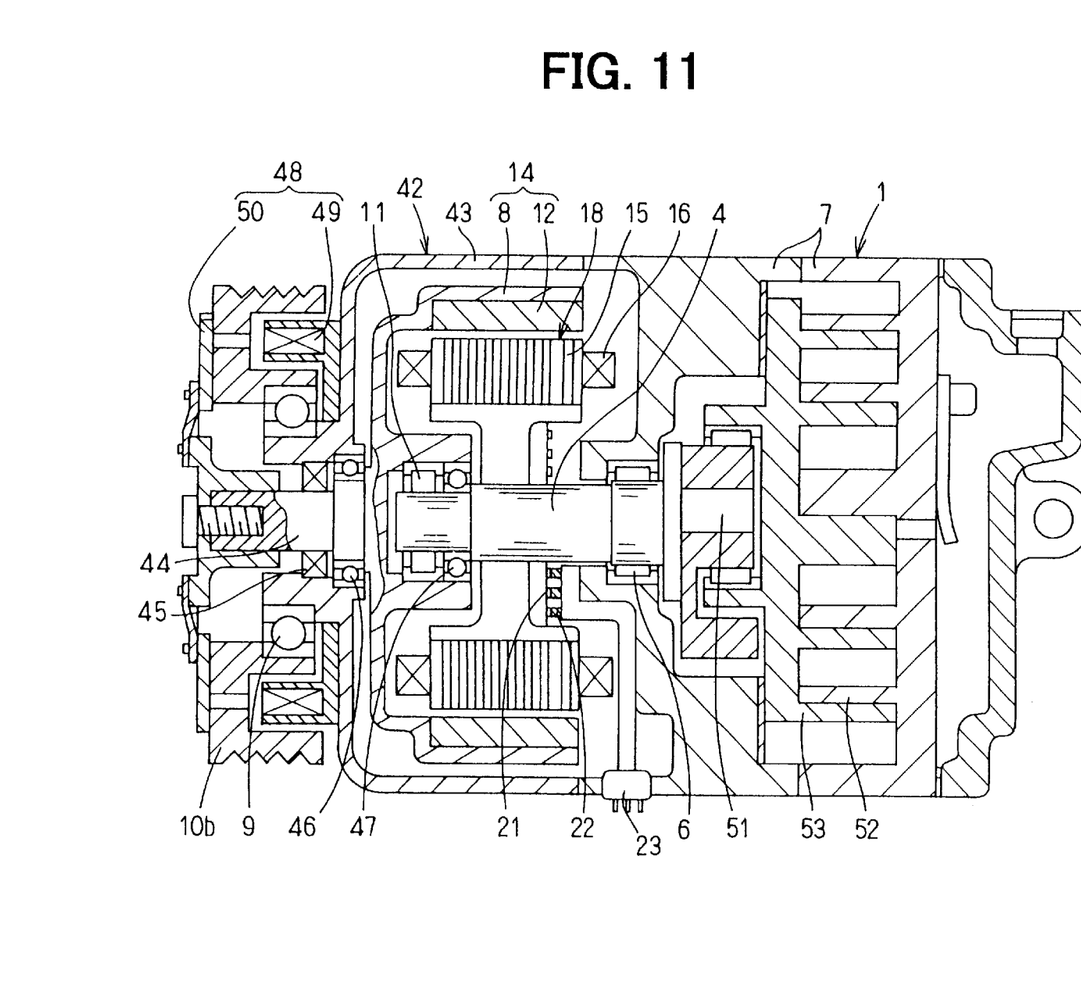
FIG. 11 is a longitudinal cross-sectional view of a principal part of a seventh embodiment of the invention.
Figure 12A:
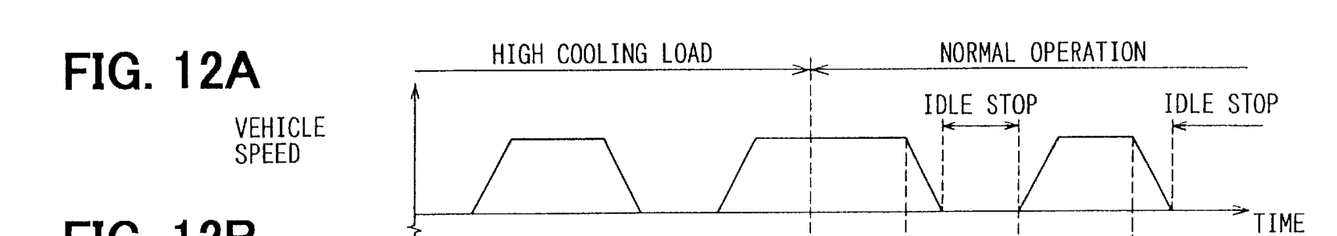
FIG. 12A is a graph illustrating the running speed of the vehicle versus time.
Figure 12B:
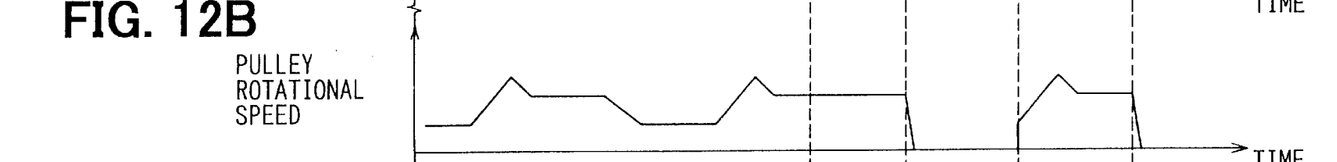
FIG. 12B is a graph illustrating the revolutions per unit time of the internal combustion engine (or the pulley) versus time.
Figure 12C:
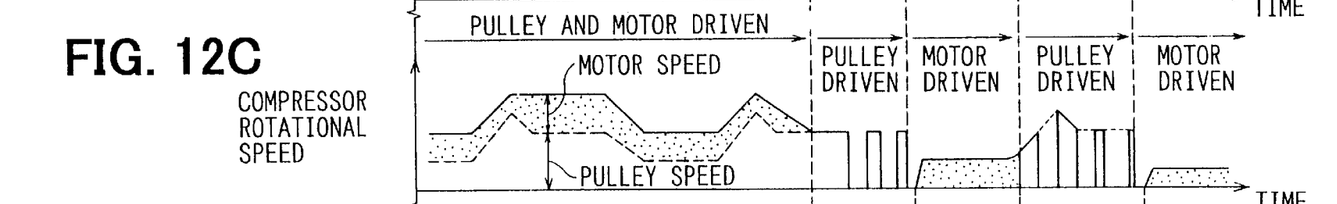
FIG. 12C is a graph illustrating revolutions per unit time of the compressor versus time.
Figure 12D:
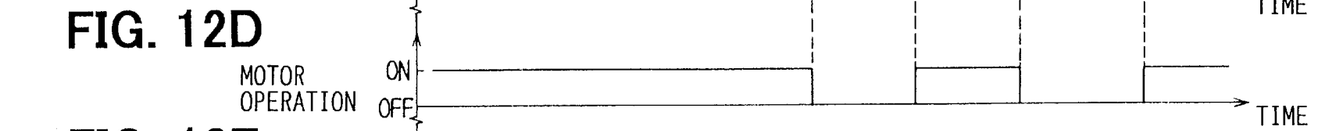
FIG. 12D is a graph illustrating the operation state of the motor versus time.
Figure 12E:
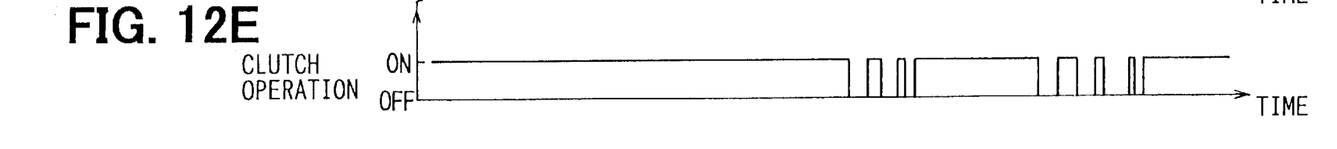
FIG. 12E is a graph showing the operation state of the clutch versus time.

FIG. 11 is a longitudinal cross-sectional view of a principal part of a seventh embodiment of the invention. FIGS. 12A through 12E represent the operation of a vehicle that includes the apparatus of FIG. 11. The seventh embodiment is similar to the sixth embodiment except that the swash plate type variable capacity compressor 1 of the sixth embodiment is replaced by a rotary type fixed capacity scroll compressor and the pulley 10b is provided with an electromagnetic clutch 48.

Scroll compressors 1 like that in FIG. 11 are well known. The compressor of FIG. 11 includes a fixed scroll 52, which engages a movable scroll 53 so that the movable scroll 53 is revolved by means of an eccentric shaft 51 to compress and discharge fluid. The electromagnetic clutch 48 is also well known. The pulley 10b is provided with coils 49 and a hub 50, and engagement between the hub 50 and the pulley 10b is interrupted by the coils 49 so that the transmission of drive force from the internal combustion engine 24 is interrupted whenever necessary. A shaft sealing device 45 is located between the pulley 10b and the motor 42.

With this arrangement, the operation of the compressor 1 can be stopped (See FIGS. 12C and 12E) while the internal combustion engine is in operation. In other words, the compressor 1 can be operated at a required discharging rate and the internal combustion engine 24 is prevented from consuming unnecessary energy.

Additionally, the efficiency of a variable capacity compressor generally falls when the compressor is driven at a reduced displacement, whereas a fixed capacity compressor does not show such a reduction of efficiency, thus the air conditioning system can be operated efficiently using this embodiment.

Since the shaft sealing device 45 is located between the pulley 10b and the motor 42, the inside of the motor 42 can communicate with the inside of the compressor 1. Thus, fluid (refrigerant) flowing to the compressor 1 can flow to the motor 42 to cool the motor 42 and prolong the life of the motor 42. Alternatively, the size of the electric motor 42 may be reduced at the cost of the extra service life.

Other Embodiments

Figure 13:
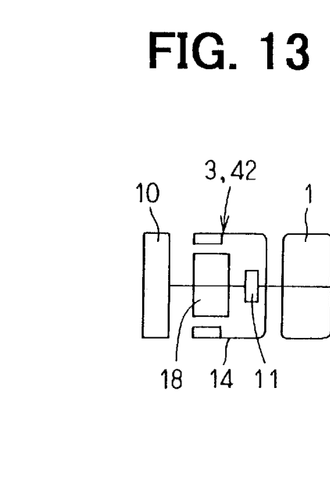
FIG. 13 is a block diagram of another embodiment of the invention, illustrating its basic configuration.

Any of the first through seventh embodiments may be so modified that the armature 18 of the motor 3, 3a, 3b, 3c, 42 is bonded to the pulley 10 and the field system 14 is bonded to the compressor 1 as shown in FIG. 13.

What is claimed is:

1. A compressor driven selectively by a first and a second drive source, wherein the compressor includes:

a pulley, which is constructed to be driven by the first drive source;

an electric motor, which serves as the second drive source, having an armature and a field system, wherein the armature and the field system of the electric motor are each independently supported in a rotatable manner, and the pulley is mechanically connected to one of the armature and the field system, and the compressor is mechanically connected to the other of the armature and the field system; and a clutch mechanism located between the armature and the field system for interlocking the pulley and the compressor to make the compressor follow the rotary motion of the pulley.

2. The compressor according to claim 1, wherein the drive system further comprises a unitary rotary sleeve having an outer peripheral surface on which the pulley is formed, and the field system is arranged directly on the inner surface of the rotary sleeve, the armature is arranged centrally within the rotary sleeve to face the field system, and at least a part of the rotary sleeve serves as a housing for the motor.

3. The compressor according to claim 1, wherein the system further comprises:

a unitary rotary sleeve having an inner surface on which the field system is directly fixed;

a dedicated motor housing in which the armature and the field system are housed, wherein the electric motor is fixed to the compressor and is integral with the compressor.

4. The compressor according to claim 3, wherein the system further comprises a shaft sealing device, for restricting leakage of fluid from inside of the compressor, wherein the sealing device is located between the pulley and the electric motor.

5. The compressor according to claim 1, wherein the field system of the electric motor includes a permanent magnet, an inner surface of which forms a field surface facing the outer peripheral surface of the armature.

6. The compressor according to claim 1, wherein the field system of the electric motor includes an iron core provided with coils, wherein an inner surface of the field system faces the outer peripheral surface of the armature.

7. The compressor according to claim 1, wherein:

the clutch device is a one-way clutch; and the torque of the first drive source is transmitted from the pulley to the compressor by the one-way clutch when the compressor is driven by the first drive source, and the pulley is allowed to rotate in an advancing direction by slippage of the one-way clutch when the compressor is driven by the electric motor.

8. The compressor according to claim 7, wherein, when the compressor is driven by the first drive source and the electric motor is operated, the one-way clutch causes the compressor to rotate with the rotational speed of the pulley plus the rotational speed of the electric motor.

9. The compressor according to claim 1, wherein the compressor is a variable capacity type compressor.

10. The compressor according to claim 1, wherein:
the compressor is a fixed capacity type compressor, and the system further comprises a clutch located between the pulley and either the armature or the field system to interrupt transmission of torque from the pulley to the compressor.

11. The compressor according to claim 1, wherein the electric motor includes brushes and at least either slip rings or commutators in association with at least either the armature or the field system.

12. The compressor according to claim 11, wherein, the armature and the rotary sleeve are provided respectively with the commutators and the brushes, and a housing of the compressor is provided with the slip rings, and the brushes are arranged to contact both the commutators and the slip rings simultaneously.

13. The compressor according to claim 11, wherein, when the compressor is driven by the first drive source through the pulley, the brushes are automatically moved away from the slip rings or the commutators.

14. The compressor according to claim 1, wherein the first drive source is an internal combustion engine mounted in a vehicle, and the engine automatically stops when the vehicle halts temporarily.

15. The compressor according to claim 14, wherein the compressor is used as a refrigerant compressor of an air conditioning system of the vehicle.

16. The compressor according to claim 1, wherein the compressor is used as a refrigerant compressor of an air conditioning system of a vehicle.

17. The compressor according to claim 14, wherein a power source of the electric motor is a battery mounted in the vehicle.

18. The compressor according to claim 1, wherein a power source of the electric motor is a battery mounted in a vehicle.

* * * * *